(12) United States Patent
Laroia et al.

(10) Patent No.: US 6,301,268 B1
(45) Date of Patent: Oct. 9, 2001

(54) COMMUNICATION METHOD FOR FREQUENCY DIVISION MULTIPLEXING SIGNALLING SYSTEMS WITH REDUCED AVERAGE POWER REQUIREMENTS

(75) Inventors: Rajiv Laroia, Princeton Junction; Thomas J. Richardson, South Orange; Rudiger L. Urbanke, Murray Hill, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/037,847

(22) Filed: Mar. 10, 1998

(51) Int. Cl.[7] .......................................... H04J 1/00
(52) U.S. Cl. ........................... 370/481; 370/480; 375/295
(58) Field of Search ..................... 370/206, 207, 370/208, 210, 480, 481; 375/244, 295, 298, 261

(56) References Cited

U.S. PATENT DOCUMENTS

| 5,201,071 | 4/1993 | Webb | 455/101 |
|---|---|---|---|
| 5,606,578 | * 2/1997 | O'Dea | 375/298 |
| 5,610,908 | 3/1997 | Shelswell et al. | 370/210 |
| 6,005,840 | * 12/1999 | Awater et al. | 370/206 |
| 6,125,103 | * 9/2000 | Bauml et al. | 370/203 |
| 6,130,918 | * 10/2000 | Humphrey et al. | 375/295 |

FOREIGN PATENT DOCUMENTS

| 19635813 | 3/1998 | (DE) . |
| 0735731 | 10/1996 | (EP) . |
| WO9610567 | 4/1996 | (WO) . |
| WO9613918 | 5/1996 | (WO) . |
| WO9810567 | 3/1998 | (WO) . |

OTHER PUBLICATIONS

Tan, B.T. et al., "Crest Factor Minimisation in FDM PSK Systems" *Electronics Letters*, vol. 26, No. 13, pp. 859–861 (1990).

Narahashi, S. et al., "Minimising Peak–To–Average Power Ratio of Multitone Signals Using Steepest Descent Method", *Electronics Letters*, vol. 31, No. 18, pp. 1552–1554 (1995).

M.J.E. Golay, Complementary Series, I.R.E. Trans. On Information Theory, vol. 7M.J.E. Golay, Complementary Series, *I.R.E. Trans. On Information Theory*, vol. 7, pp. 82–87 (1961).

\* cited by examiner

*Primary Examiner*—Min Jung
(74) *Attorney, Agent, or Firm*—Martin I. Finston

(57) ABSTRACT

We describe an improved method for decreasing the probability of an unacceptably high peak-to-average power ratio in a signal to be transmitted by a Frequency Division Multiplexing (FDM) system, such as a discrete multitone (DMT) system. The method involves generating at least two alternative signal sequences, computing Fourier transforms of the respective alternative signal sequences, and selecting for transmission one of these sequences, based on the Fourier transform computations. More specifically, the selection of one sequence may be based, e.g., on the determination that the Fourier transform of that sequence has an acceptable peak power. Alternatively, a comparison may be made among the Fourier transforms of the respective signal sequences, and selection made of that sequence whose Fourier transform exhibits the lowest peak power.

14 Claims, 3 Drawing Sheets

COMMUNICATION METHOD FOR FREQUENCY DIVISION MULTIPLEXING SIGNALLING SYSTEMS WITH REDUCED AVERAGE POWER REQUIREMENTS

FIELD OF THE INVENTION

This invention relates to data communication using frequency division multiplexing systems. More particularly, the invention relates to methods for encoding information for transmission by such systems.

BACKGROUND OF THE INVENTION

Frequency division multiplexing (FDM) is a multiplexing technique that has applications for both wireline and wireless applications. The former include, inter alia, applications to digital subscriber loop communications, and the latter include, inter alia, applications to WaveLan communications.

FDM in certain implementations is described in the discrete multitone (DMT) standard published by the International Telecommunications Union (ITU) under the publication number T1.413.

Very briefly, FDM operates by dividing a data stream into a temporal sequence of blocks. With reference to FIG. 1, the data in each block (the "information sequence") are represented, in frequency space, by a sequence of tones 10 (also referred to as carriers). The number of tones used varies among the various implementations, but is typically in the range 32–512. Information is encoded by assigning to each tone a complex amplitude (that is, a positive magnitude and a phase). The complex amplitudes that can be assigned are not arbitrary, and they do not vary continuously. Instead, they are typically drawn from a discrete set, sometimes referred to as a constellation, of points in the complex plane. (An illustrative such constellation is shown in FIG. 2.) Although the number of points in such a constellation may vary, a typical number of points lies in the range 2–512. In the case, e.g., of 256 points, each complex amplitude represents $\log_2 256$, or 8, bits of data. The sequence of amplitudes is referred to as the "signal sequence", and each amplitude in this sequence is referred to as a "signal element".

The transmitted signal (shown as element 20 in FIG. 1) is the Fourier transform of the sequence of tones. (Those skilled in the art will appreciate that what is precisely meant here is a real-valued reverse Fourier transform from the frequency domain to the time domain.) The receiver performs, in essence, another Fourier transform back into frequency space to recover the signal sequence. At the receiver, knowledge concerning the mapping between the information sequence and the signal sequence is used to recover the information sequence.

Those familiar with oscillatory phenomena will appreciate that when tones, with associated phase differences, are superimposed, constructive interference often leads to the emergence of peaks that extend to a significant height above the average amplitude of the combined waveform. When a transmitted signal exhibits this property, it is often useful to characterize the signal by its peak-to-average power ratio. It should be noted in this regard that the average transmitted power is directly related to the rate at which information can be communicated. That is, higher average power implies higher potential data-communication rate. The term "average" refers here to the statistical, or ensemble, average over all signals. The term "peak", on the other hand, refers to a particular sequence.

For several reasons, it is desirable to limit the peak-to-average power ratio of a transmitted signal. In many instances, there are standards and regulations that impose a limit on this quantity. More fundamentally, the last amplification stage of the transmitter may be saturated by amplitude peaks in its input signal, resulting in clipping of the transmitted waveform and consequent errors in data transmission. In principle, an amplifier can be designed to handle essentially any given peak-to-average power ratio encountered in practice. However, the cost of the amplifier and also the power consumption of the amplifier increase as the maximum acceptable peak power increases. As a consequence, economic considerations militate for measures designed to minimize the probability that a peak will appear that cannot be transmitted without distortion. Although the greatest acceptable value for this probability depends on the specific application and on other factors, a typical value is $10^{-5}$.

One conventional approach to this problem is to limit the permitted signals to only those signals that have an acceptably low peak power. This approach is difficult to put into practice because it is difficult to identify a suitable set of signals in the frequency domain. Moreover, decreasing the population of available signals decreases the number of bits carried by each signal element. Because a substantial fraction of signals are typically eliminated by this approach, the transmitted data rate is significantly reduced.

SUMMARY OF THE INVENTION

We have discovered an improved method for decreasing the probability of an unacceptably high peak-to-average power ratio. In a broad aspect, our invention involves generating at least two distinct, alternative signal sequences, computing Fourier transforms of the respective alternative signal sequences, and selecting for transmission one of these sequences, based on the Fourier transform computations. More specifically, the selection of one sequence may be based, e.g., on the determination that the Fourier transform of that sequence has an acceptable peak power. Alternatively, a comparison may be made among the Fourier transforms of the respective signal sequences, and selection made of that sequence whose Fourier transform exhibits the lowest peak power. Those skilled in the art will understand that the term "Fourier transform" is used here to encompass any of several appropriate mathematical transforms, and that each can be implemented by any of several appropriate computational algorithms.

Desirably, the alternative sequences are generated in such a way that the joint probability that both will lead to unacceptable peak-to-average power ratios is significantly smaller than the individual probabilities that each alone will lead to such a ratio. This can be achieved by providing for near statistical independence between the respective alternative sequences. This independence may be achieved by operating upon the information sequence, or by operating upon the signal sequence, or in the coding procedure that maps between the information sequence and the signal sequence.

At the receiver, it should be possible to recover the same information sequence from either of the alternative signal sequences.

According to a currently preferred embodiment of the invention, the signal elements are generated by a differential encoding scheme, in which information is largely carried by the differences between pairs of signal elements. The signal elements are partitioned into two disjoint sets in such a way that each information-carrying pair belongs entirely to one or the other of the two sets. Given a signal sequence of signal elements, a further signal sequence is derived by applying a rotation in the complex plane to those signal elements that belong to one of the two disjoint sets. The rotation applied is a rotation under which the constellation of signal-element values is invariant.

According to an alternate embodiment of the invention, alternative information sequences are generated by forming at least one encrypted version of the original information sequence. Alternative signal sequences are generated simply by encoding respective alternative information sequences. Decryption information is available at the receiver so that the original information sequence can be recovered from either of the alternative signal sequences.

DETAILED DESCRIPTION

Most FDM signal schemes use contellations with certain symmetries in the frequency domain. For example, the signal constellations $\Omega_1, \Omega_2, \ldots, \Omega_n$ (n a positive integer) associated with the respective signal elements $s_1, s_2, \ldots, s_n$ are often invariant under rotations in the complex plane by integer multiples of $\pi/2$ radians. (Those skilled in the art will appreciate that a rotation by any angle $\theta$ is equivalent to multiplication of the corresponding complex amplitude by $e^{i\theta}$.) Certain illustrative embodiments of the invention make use of this symmetry, as we explain below.

Let c represent a rotation by $m\pi/2$ radians, where m is chosen from the set of values 0, 1, 2, and 3. Let each of the signal constellations $\Omega_i (i=1, 2, \ldots, n)$ be invariant under the rotations c; that is, $c\Omega_i = \Omega_i$. Let the signal sequence $s_1, s_2, \ldots, s_n$ (shown in FIG. 3 as element 40) represent a differentially encoded signal in which the information that is carried depends largely on differences $s_i - s_j$, $i \neq j$, $j=1, 2, \ldots, n$.

In accordance with certain embodiments of the invention, the indices 1, 2, . . . , n are partitioned (block 70 of FIG. 3) into disjoint sets A and B, and the differential coding is carried out such that the only differences $s_i - s_j$ that carry information relate to index pairs in which i and j both belong to set A or to set B.

Figure 1:
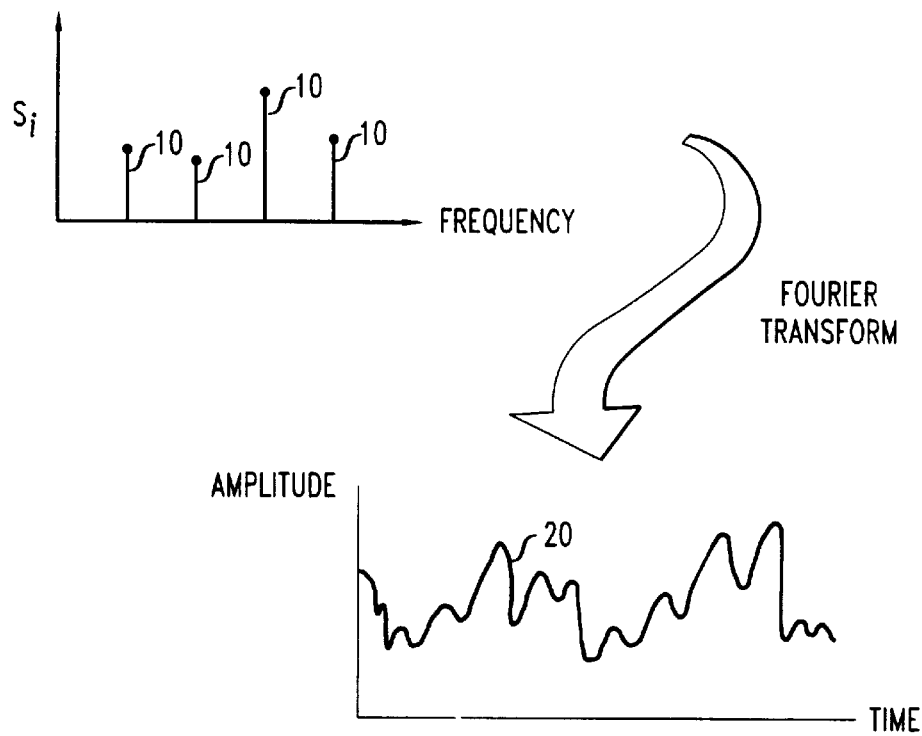
FIG. 1 shows, in schematic fashion, the relationship between the frequency spectrum represented by a signal sequence and the corresponding time-domain waveform.
Figure 2:
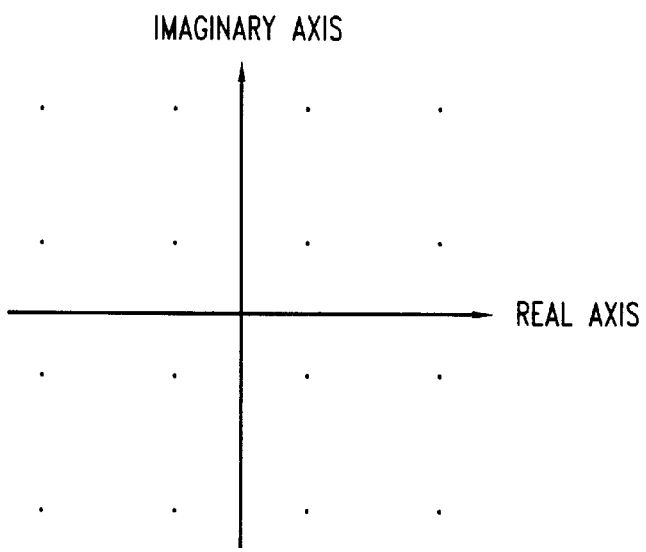
FIG. 2 is a simple example of a signal constellation that is invariant under rotation by $\pi/2$ radians.
Figure 3:
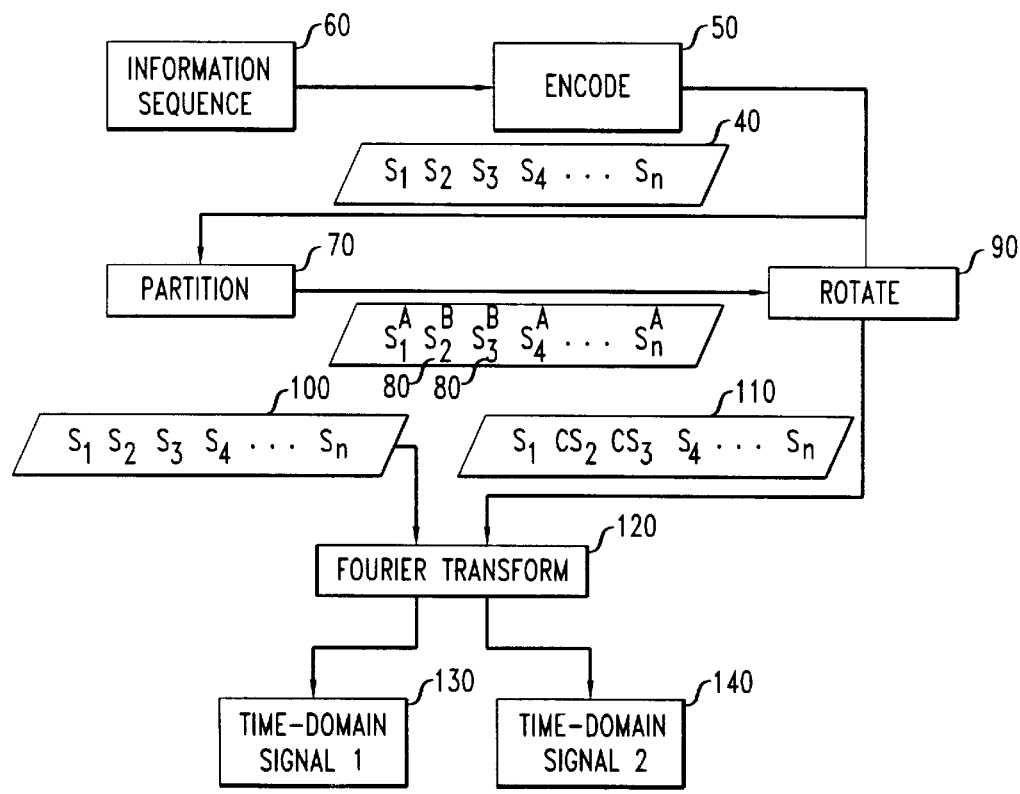
FIG. 3 is a flowchart illustrating the generation of two alternative signal sequences, in accordance with an exemplary embodiment of the invention. An original signal sequence 40 is obtained by encoding (block 50 of the figure) an information sequence 60, and then a further signal sequence is generated.

With further reference to FIG. 3, given an initial signal sequences $s_1, s_2, \ldots, S_n$ (element 40 of the figure), the transmitter generates a further signal sequence by rotating (block 90) those signal elements whose indices belong to one of the two disjoint sets (e.g., to set B). (In the figure, those elements whose indices belong to set B and hence are exemplarily rotated are indicated by the reference numeral 80.) Typically, one such rotation will be carried out, leading to one further signal sequence. However, two or even three rotations may be carried out, leading to as many as four alternative signal sequences (including the initial sequence).

Because of the rotational symmetry of the signal constellations, most of the signal processing carried out by the receiver is unaffected by the alternative signal encoding.

Each of the alternative signal sequences 100, 110 will carry the same information to the receiver. Thus, the transmitter can select from among the alternative signals in such a way as to minimize the peak-to-average power requirement, or to assure that the peak-to-average power ratio lies within established limits with high probability.

The selection process involves calculating a Fourier transform (block 120) of at least one of the alternative signal sequences to produce a time-domain signal 130, 140. As noted, the term "Fourier transform" encompasses several appropriate mathematical transforms and computational implementations thereof. For example, it is advantageous in Orthogonal Frequency Multiplexing (OFDM) systems to calculate the Fourier transform using a Fast Fourier Transform (FFT) algorithm.

Figure 4:
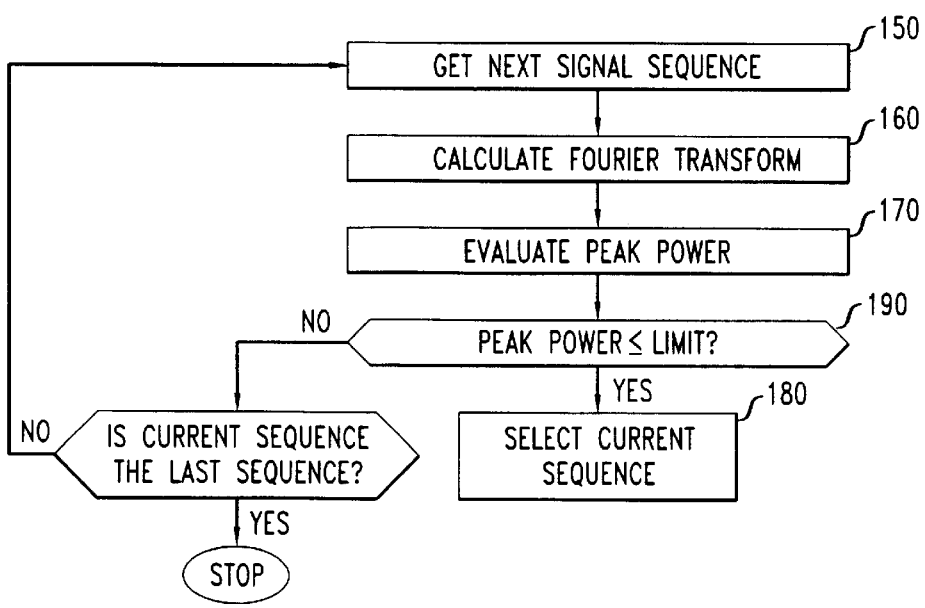
FIG. 4 is a flowchart of an exemplary algorithm for selecting a signal sequence for transmission, based on a test of whether the peak power falls below an established limit.

According to one exemplary approach illustrated in FIG. 4, each of the alternative signal sequences is obtained (block 150), transformed in turn (block 160), and its peak power calculated (block 170), but the procedure makes a selection and stops (block 180) as soon as a test (block 190) finds a signal whose peak power lies at or below an established limit.

Figure 5:
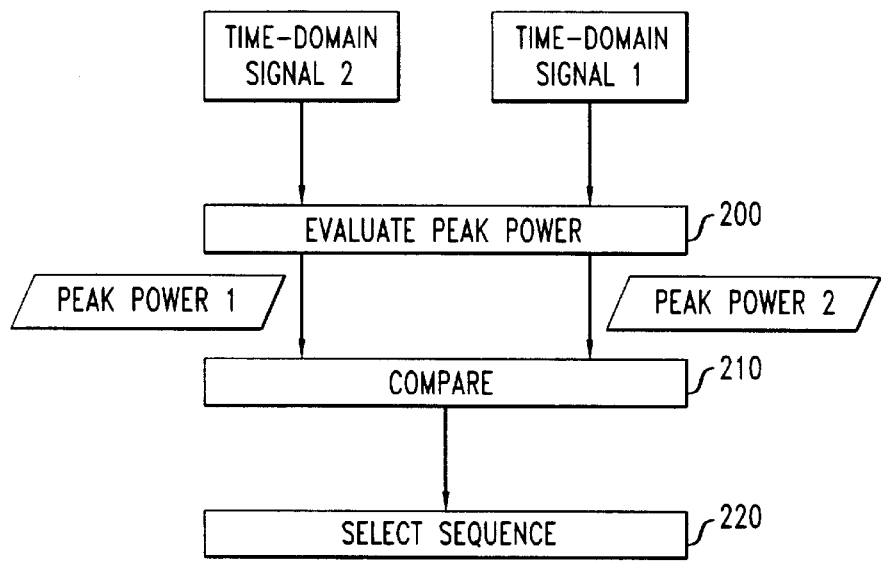
FIG. 5 is a flowchart of an exemplary algorithm for selecting a signal sequence for transmission, based on finding the lowest peak power.

According to a second exemplary approach illustrated in FIG. 5, all of the alternative signal sequences are transformed and their peak powers determined (block 200). Then, a comparison is performed (block 210), and that sequence having the lowest peak power is selected for transmission (block 220). Those skilled in the art will appreciate that various combinations and variations of these procedures are also readily implemented. For example, it will be advantageous in at least some cases to combine the procedures described above. Thus, if none of the alternative sequences are found according to the former procedure to produce a peak power that falls below the established limit, that sequence producing the lowest such power would be selected in accordance with the latter procedure.

If the alternative sequences had complete statistical independence from each other, the joint probability that all of them would produce an unacceptable peak-to-average power ratio would be the product of the (generally equal) probabilities that each alone would produce such a ratio. Because only a coincidence among all of the alternative sequences would cause an unacceptable peak to be transmitted, the probability of such a transmission is reduced to this joint probability. Because the alternative sequences are carrying the same information, they are generally not, in fact, entirely independent of each other. However, we believe that the rotation procedure can be made to produce enough variation between alternative sequences for them to behave under the Fourier transform, for our purposes, as though they were substantially statistically independent. Thus, we have very high assurance that the joint probability of an unacceptable peak is substantially less than the individual probability thereof.

It should be noted in this context that to achieve effective statistical independence, it will be advantageous in most cases for the partition of the index set to be carried out such that A and B are of approximately the same size. (If the partition is into more than two disjoint sets, it will likewise be generally advantageous for all of the disjoint sets to be of approximately equal size.)

By judicious choice of the partition and the rotation or rotations, it is also possible to minimize the incidence of peaks in the corresponding time-domain signal. That is, let the coefficient of each unrotated signal element be 1, and let the coefficient of each rotated signal element be $e^{im\pi/2}$, where m has an appropriate value. Those skilled in the art will recognize a mathematical relationship between the Fourier transforms of the original and rotated signal sequences: the second is the convolution of the first with the Fourier transform of the sequence of coefficients. In order to avoid enhancing peaks in the product of this convolution, it is desirable to choose sequences having the flattest possible Fourier transforms.

Thus, by imposing the restriction that the signals must be differentially encoded and by applying the methods of the present invention, we can substantially reduce the peak-to-average power requirements of the transmitter. Since the restriction to differential encoding imposes a relatively small penalty in the number of bits that may be transmitted, the advantages that we gain are achieved at a relatively small cost.

One fundamental penalty is imposed by this scheme. It is imposed because multiple signal sequences carry the same information. If it were not for this redundancy, more information could be carried per signal sequence. If two alternative signal sequences are provided for each information sequence, the penalty is one bit per signal sequence; if four alternative signal sequences are provided, the penalty is two bits, etc.

An additional penalty is imposed by the differential encoding scheme itself. However, there are ways to minimize this penalty. For example, the differential encoding can be limited to signal elements whose indices lie in set B. Along with such a scheme, it is also advantageous for the first signal element whose index lies in set B to encode information (without relying on differences) in such a way that the images of that element (in the signal constellation) under all of the allowable rotations are equivalent.

In at least some cases, it will be advantageous for m to be chosen only from the set {0,2}. Stated differently, only one rotation is available, and that rotation is carried out by multiplying all of the B-indexed signal elements by −1. In such a case, the partition is conveniently represented as a sequence $G_1, G_2, \ldots, G_n$, in which $G_i$ is 1 if i is in A, and $G_i$ is −1 if i is in B. Those skilled in the art will recognize a mathematical relationship between the Fourier transforms of the original and rotated signal sequences: the second is the convolution of the first with the Fourier transform of the sequence $G_i$. As noted above in connection with a more general case, it is desirable to choose sequences $G_i$ having the flattest possible Fourier transforms. Such sequences, known as Golay sequences, have been tabulated. Reference is made, for example, to M. J. E. Golay, "Complementary Series," *I.R.E. Trans. On Information Theory*, Vol. 7 (April 1961) pages 82–87. The maximum magnitude of the Fourier transform of a Golay sequence is near the theoretical minimum, namely, $\sqrt{2}$ times the root-mean-square magnitude.

Thus, according to one alternate embodiment of the invention, the partition into sets A and B is made by sequentially assigning the multiplier 1 (for set A) or −1 (for set B) to signal elements in accordance with a Golay sequence. It should be noted in this regard that other methods for assigning these multipliers will also be useful, such as random assignment.

We noted, above, that rotation by multiples of $\pi/2$ radians is often advantageous because of symmetries of the signal constellations. Yet other rotations may be advantageous in some cases, provided only that the signal constellations are invariant under these rotations. Thus, for example, alternate embodiments of the invention are readily envisaged in which set B is multiplied by one or more integer multiples of $\pi/3$ radians.

It should also be noted that partition into more than two disjoint sets may be advantageous in some cases. When a partition is made into more than two disjoint sets, any choice of one or more of the disjoint sets may be subjected to a chosen rotation.

In a broader sense, the invention can be described in terms of operations (including rotations but also including, e.g., other permutations of the elements of the signal constellations) that map each signal constellation onto itself. Suppose that each of n operations $g_i$, i=1, 2, . . . , n, maps a respective signal constellation $\Omega_i$ onto itself. In this broader sense of the invention, as many as n distinct operations may be represented. Suppose that each operation $g_i$ is iteratively applied to its respective signal element $s_i$, an integer number $l_i$ of times. Thus, a further signal sequence is generated, whose i'th element is $g_i^{l_i s_i}$. The integers $l_i$ may be chosen arbitrarily, but they must be known to the receiver. The encoding and decoding procedures must be such that the original sequence and the transformed sequence represent the same information.

Typically, there will be some smallest integer k with the property that $g_i^{kl_i}$ is the identity function for each value of the index i; that is, $g_i^{kl_i}$ maps every signal element $s_i$ into itself. Thus, k distinct signal sequences can be generated, and any one of these sequences may be used for transmission.

In its broadest sense, the invention involves generating alternative signal sequences that map to the same information sequence. In the embodiments described above, further signal sequences are generated by operating on the signal elements of an original sequence. It should be noted that other techniques are also available for generating alternative signal sequences.

For example, alternative signal sequences may be generated when the information sequence is encoded as a signal sequence. Encoding techniques are readily employed that are redundant in the sense that the same information sequence gives rise to two or more alternative signal sequences, each carrying the same information and each mappable back to the information sequence. Significantly, such encoding techniques are not necessarily differential encoding techniques.

In yet other embodiments of the invention, alternative information sequences are provided by operating at least once upon an original information sequence. Because such operations are similar to operations used to make information sequences secure against unauthorized interception, we refer to those operations as encryption. Alternative signal sequences are then generated from the alternative information sequences.

For example, suppose that an information sequence $(b_1, b_2, \ldots, b_m)$ consists of m binary bits, m a positive integer, and that a mapping F maps this information sequence into the signal sequence $(s_1, s_2, \ldots, s_n)$. The mapping F is invertible, so that the receiver can recover the information sequence from the received signal sequence.

According to the embodiment of the invention now to be described, an encryption algorithm G maps the information sequence ($b_1, b_2, \ldots, b_m$) into an encrypted information sequence ($b'_1, b'_2, \ldots, b'_m$), which also consists of m binary bits. Preferably, this mapping is random in nature. It should be known to the receiver, and invertible by the receiver.

One possible choice for the algorithm G is a random permutation of the m elements of the sequence. A generator of pseudo-random binary sequences can be used to further randomize the encrypted sequence. For example, the permuted sequence can be modulated by lining it up with a pseudo-random sequence of the same length, and performing a bit-by-bit exclusive-or operation between the two sequences. Provided that the receiver also possesses the pseudo-random sequence used for modulation, the original information sequence will be recoverable.

In fact, there are well-known methods for synchronizing the transmitter with the receiver, so that G can vary over time according to a pseudo-random sequence generated at both the transmitter and the receiver. In that case, G can be a (synchronized) sampling from a pseudo-random process.

Figure 6:
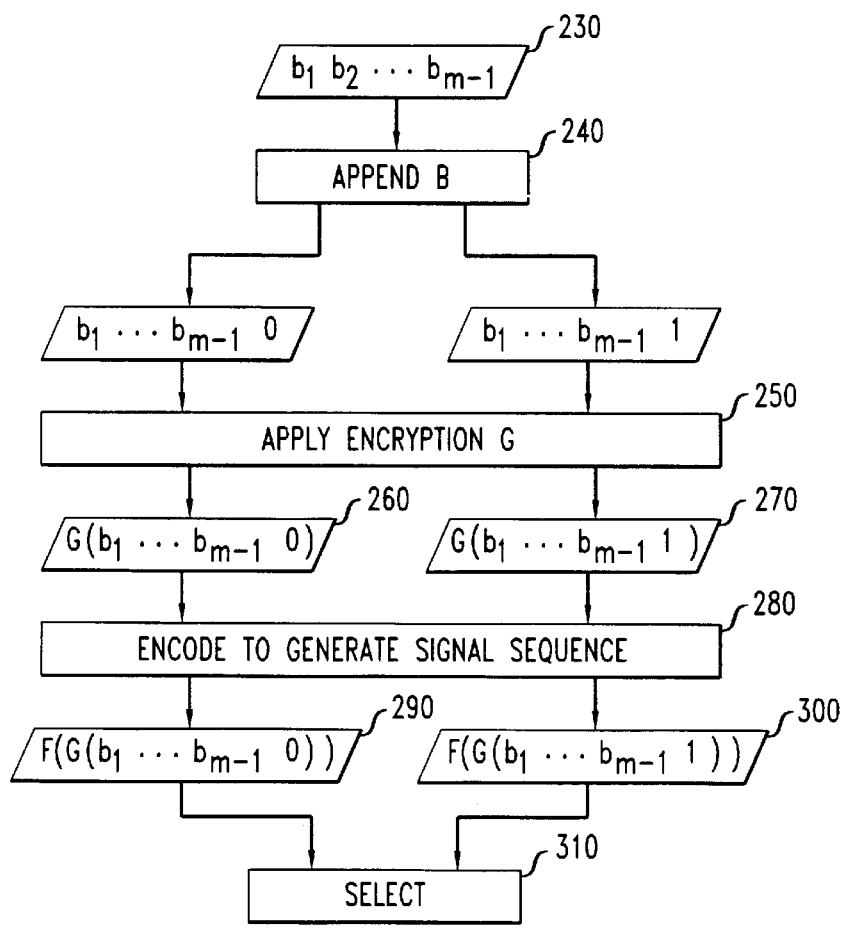
FIG. 6 is a flowchart of a procedure for generating alternative information sequences, according to the invention in an alternate embodiment.

With reference to FIG. 6, we will now describe an illustrative method whereby the algorithm G is used to generate two alternative information sequences for subsequent encoding as respective alternative signal sequences.

Let the original information sequence 230 have length m−1, and append to it (block 240) an m'th binary bit B. By respectively giving B the values 0 and 1, the encryption operation $G((b_1, b_2, \ldots, b_{m-1}, B))$ (block 250) generates two distinct encrypted information sequences 260, 270.

Both of these alternative sequences are readily encoded (block 280) as signal sequences 290, 300. One of the signal sequences is selected (block 310) for transmission, as described above. Thus, the signal sequence selected for transmission is $F(G((b_1, b_2, \ldots, b_{m-1}, B)))$, where B is 0 or 1, as appropriate. At the receiver, F and G are inverted, and B is simply ignored, in order to recover the original information sequence.

This scheme is readily extended to generate larger sets of alternative sequences. For example, if two bits $B_1$ and $B_2$ are reserved, four alternative encrypted information sequences are readily generated.

What is claimed is:

1. A method for encoding information for transmission by a frequency division multiplexing system, comprising differentially encoding the information as a signal sequence $s_1, \ldots, s_n$ (n a positive integer) of complex signal elements, resulting in representation of the information by differences between at least some pairs of signal elements, wherein:
    (a) each signal element is selected from a set that is invariant under multiplication by $e^{im\pi/2}$, m=0, 1, 2, 3;
    (b) the signal elements are partitioned into at least two disjoint groupings, and the differential encoding is carried out such that each of said pairs is drawn solely from one of said groupings;
    (c) the method further comprises generating at least one further signal sequence such that there are provided at least two alternate signal sequences; and
    (d) the step of generating each further signal sequence comprises multiplying at least one, but not all, of said groupings by $e^{im\pi/2}$, −1, or $e^{i3\pi/2}$.

2. A method for encoding information for transmission by a multiplexing system, comprising:

a) processing at least one data sequence, thereby to generate at least two alternative coded sequences of signal elements, wherein each signal element is a complex amplitude of a respective tone that is to be transmitted, and the alternative coded sequences contain equivalent data content;
    b) selecting one of the alternative coded sequences according to a criterion for limiting peak power in coded sequences that are to be transmitted; and
    c) transmitting the selected sequence, wherein:
        the alternative coded sequences include at least a first and a second alternative coded sequence;
        each signal element is selected from a constellation of signal elements;
        the method includes deriving the second said sequence from the first said sequence; and
        said derivation comprises replacing at least two elements of the first said sequence by their respective images under a permutation of the respective constellations from which said elements are selected.

3. The method of claim 2, wherein the permutation is a rotation, in the complex plane, that maps each of the respective constellations into itself.

4. The method of claim 3, wherein the rotation is equivalent to multiplication by a factor selected from the group consisting of $e^{im\pi/2}$, −1, and $e^{i3\pi/2}$.

5. The method of claim 2, wherein:
    a) the processing is carried out such that at least a portion of the data content in each of the alternative coded sequences is encoded by differences between paired elements;
    b) the elements of the first alternative coded sequence are partitioned into at least two non-intersecting groups;
    c) the data content is encoded such that paired elements must belong to the same group; and
    d) the elements that are replaced by their permuted images are the elements belonging to at least one, but not all, of the non-intersecting groups.

6. The method of claim 5, wherein the permutation is a rotation in the complex plane.

7. The method of claim 6, wherein the rotation is equivalent to multiplication by a factor selected from the group consisting of $e^{im\pi/2}$, −1, and $e^{i3\pi/2}$.

8. The method of claim 5, wherein there are at least three non-intersecting groups, the elements of at least two groups are replaced by their permuted images, and a distinct permutation is applied to each of the permuted groups.

9. The method of claim 5, wherein the permutation is equivalent to multiplication by −1.

10. The method of claim 9, wherein the elements of the first alternative coded sequence are partitioned into precisely two non-intersecting groups, and the partition is carried out by mapping a Golay sequence onto the first alternative coded sequence.

11. A method for encoding information for transmission by a multiplexing system, comprising:

a) processing at least one data sequence, thereby to generate at least two alternative coded sequences of signal elements, wherein each signal element is a complex amplitude of a respective tone that is to be transmitted, and the alternative coded sequences contain equivalent data content;
    b) selecting one of the alternative coded sequences according to a criterion for limiting peak power in coded sequences that are to be transmitted; and
    c) transmitting the selected sequence, wherein the processing step comprises:

encrypting the data sequence, thereby to generate a further data sequence, the non-encrypted sequence to be referred to as the plain sequence, and the encrypted sequence to be referred to as the cipher sequence;

encoding the plain sequence, thereby to generate a first alternative coded sequence; and encoding the cipher sequence, thereby to generate a second alternative coded sequence.

12. The method of claim 11, wherein the encryption is carried out by permuting the elements of the plain sequence.

13. A method for encoding information for transmission by a multiplexing system, comprising:

a) processing at least one data sequence, thereby to generate at least two alternative coded sequences of signal elements, wherein each signal element is a complex amplitude of a respective tone that is to be transmitted, and the alternative coded sequences contain equivalent data content;

b) selecting one of the alternative coded sequences according to a criterion for limiting peak power in coded sequences that are to be transmitted; and c) transmitting the selected sequence, wherein the processing step comprises:

appending at least one special data element to the data sequence, said special data element having alternative values, thereby to provide at least two distinct augmented data sequences;

encrypting said at least two augmented data sequences, resulting in at least two encrypted sequences; and encoding the at least two encrypted sequences.

14. The method of claim 13, wherein each special data element comprises at least one bit having alternative values 0 and 1.

* * * * *